United States Patent
Kato et al.

(10) Patent No.: US 8,195,737 B2
(45) Date of Patent: Jun. 5, 2012

(54) PROCESS MANAGEMENT APPARATUS, COMPUTER SYSTEMS, DISTRIBUTED PROCESSING METHOD, AND COMPUTER PROGRAM

(75) Inventors: Hiroki Kato, Kanagawa (JP); Hirotoshi Maegawa, Tokyo (JP); Takayuki Ishida, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 50 days.

(21) Appl. No.: 11/629,478

(22) PCT Filed: Jun. 9, 2005

(86) PCT No.: PCT/JP2005/010986
§ 371 (c)(1),
(2), (4) Date: Sep. 18, 2008

(87) PCT Pub. No.: WO2005/124548
PCT Pub. Date: Dec. 29, 2005

(65) Prior Publication Data
US 2009/0013023 A1    Jan. 8, 2009

(30) Foreign Application Priority Data
Jun. 15, 2004    (JP) .................................. 2004-177460

(51) Int. Cl.
*G06F 15/16* (2006.01)
*G06F 9/46* (2006.01)
(52) U.S. Cl. ........................................ 709/201; 718/102
(58) Field of Classification Search ........... 709/201–202
See application file for complete search history.

(56) References Cited

U.S. PATENT DOCUMENTS

| | | | |
|---|---|---|---|
| 5,473,595 A | | 12/1995 | Hayashi |
| 5,826,239 A | * | 10/1998 | Du et al. ........................ 705/8 |
| 5,829,041 A | | 10/1998 | Okamoto et al. |
| 5,870,545 A | * | 2/1999 | Davis et al. .................. 709/201 |
| 6,009,455 A | * | 12/1999 | Doyle ........................... 709/201 |
| 6,470,375 B1 | * | 10/2002 | Whitner et al. ............... 718/105 |

(Continued)

FOREIGN PATENT DOCUMENTS

JP    57146367 A    9/1982

(Continued)

OTHER PUBLICATIONS

International Search Report Dated Sep. 27, 2005.

(Continued)

*Primary Examiner* — Krista Zele
*Assistant Examiner* — Esther Benoit
(74) *Attorney, Agent, or Firm* — Matthew B. Dernier, Esq.; Gibson & Dernier LLP

(57) ABSTRACT

When performing distributed processing in processing devices connected to a network and a processing managing device for managing the processing devices, it is possible to eliminate the overhead of the processing management device. The processing management device (PU) (203) managing processing devices (SPU) (207) under its control lists the network address of the SPU (207) and other SPU connected to the network and resource information indicating the current task execution ability of the SPU in a resource list. When one of the SPU transmits a task request to the PU (203), the PU (203) specifies one or more SPU capable of performing the task request in the resource list and requests the specified SPU to execute a task including the execution result specification destination, thereby enabling execution result transmission/reception not using the PU (203).

17 Claims, 12 Drawing Sheets

U.S. PATENT DOCUMENTS

| | | | |
|---|---|---|---|
| 6,618,820 B1 * | 9/2003 | Krum | 714/13 |
| 6,938,256 B2 * | 8/2005 | Deng et al. | 718/104 |
| 6,959,372 B1 * | 10/2005 | Hobson et al. | 711/168 |
| 6,996,821 B1 * | 2/2006 | Butterworth | 718/100 |
| 7,475,107 B2 * | 1/2009 | Maconi et al. | 709/202 |
| 7,478,390 B2 * | 1/2009 | Brokenshire et al. | 718/100 |
| 7,617,309 B2 | 11/2009 | Yoshida et al. | |
| 2003/0135613 A1 | 7/2003 | Yoshida et al. | |
| 2004/0078793 A1 * | 4/2004 | Bragulla et al. | 717/174 |
| 2005/0081203 A1 * | 4/2005 | Aguilar et al. | 718/100 |
| 2005/0086655 A1 * | 4/2005 | Aguilar et al. | 717/176 |
| 2005/0204029 A1 * | 9/2005 | Connolly et al. | 709/223 |
| 2010/0023612 A1 | 1/2010 | Yoshida et al. | |

FOREIGN PATENT DOCUMENTS

| | | |
|---|---|---|
| JP | 06168212 A | 6/1994 |
| JP | 06309284 A | 11/1994 |
| JP | 06-348662 | 12/1994 |
| JP | 07-056754 | 3/1995 |
| JP | 07-141302 | 6/1995 |
| JP | 0844677 A | 2/1996 |
| JP | 08-083253 | 3/1996 |
| JP | 0883253 A | 3/1996 |
| JP | 08137686 A | 5/1996 |
| JP | 09160884 A | 6/1997 |
| JP | 2000112908 A | 4/2000 |
| JP | 2001337864 A | 12/2001 |
| JP | 2003256303 A | 9/2003 |
| JP | 2003316459 A | 11/2003 |
| JP | 2004-287801 | 10/2004 |
| WO | 03038545 A2 | 5/2003 |

OTHER PUBLICATIONS

Office Action for corresponding JP Application 2005-220012, dated Feb. 12, 2008.

Office Action for corresponding EP Application 05751219.6-2211, dated Nov. 22, 2010.

Office Action for corresponding JP Application 2004-177460, dated Nov. 10, 2009.

Office Action for corresponding JP Application 2004-177460, dated Jan. 6, 2011.

Office Action for corresponding KR Application 10-2007-7000776, dated Jul. 28, 2011.

Office Action for corresponding Japanese Application No. 2004-177460, Oct. 4, 2011.

* cited by examiner

PROCESS MANAGEMENT APPARATUS, COMPUTER SYSTEMS, DISTRIBUTED PROCESSING METHOD, AND COMPUTER PROGRAM

TECHNICAL FIELD

The present invention relates to a computer system that allows execution of a task efficiently by a plurality of computers connected to a broadband network environment, a distributed process method and computer architecture for allowing such a distributed process.

BACKGROUND OF THE INVENTION

It is known to use a plurality of computers connected to the network to cooperate for carrying out distributed processing of a task. Conventionally, when carrying out a distributed processing of a task, a server in which the processing capabilities of all the computers connectable with a network are stored is essential in deciding which task is assigned to which computer. The server specifies the magnitude of the load of the task and the excess process capability (calculation resources) of each computer connected to the network when attempting to perform distributed processing. Each task is then sequentially assigned to the computer having the excess processing capability corresponding to the load, and the executed result of the task is received from the computer to which the task is assigned.

In the distributed processing method requiring a server in the prior art, it is very difficult for the server to detect the excess processing capability of the computers, which are arbitrarily connected to and disconnected from the network. Further, the server must receive the executed result from the computer to which the distributed processing of the task is requested, and must transmit the result to the requester of the task. Thus, the overhead of the server is increased because all communication must pass through the server. Therefore, the problem often arises that the time required for the execution of the task is increased, and the time required for the data communications through the network is also increased.

It is a main object of the present invention to provide a structure of the distributed processing that overcomes the conventional problem.

DISCLOSURE OF THE INVENTION

The present invention overcomes the above-mentioned problem with a device and a computer program for a characteristic process management apparatus, a computer system and distributed processing management.

The process management apparatus of the present invention is adapted to be connected to a network to which a plurality of processing devices are connected. Each of the processing devices is capable of (i.e., is designed to provide the function of) executing a requested task and transferring the executed result to a destination designated by the requester of the task. The processing management apparatus comprises: first management means for allowing access to a predetermined memory in which resource information for representing task execution capability of the processing devices connected to the network and communication setting information for enabling network communication with the processing devices are listed; second management means for specifying, upon receiving a task demand from any of the processing device through network communication, a processing device that is capable of executing the task by the resource information listed in the memory, wherein the second management means acquires the communication setting information for the specified processing device from the memory, and transfers, to at least one processing device from the specified processing device and the processing device that requested the task demand, the communication setting information for the other processing device, thereby allowing direct transfer of the executed result between the processing devices through network communication. In this way server overhead is decreased because there is no need for all communications to pass through the server.

The process management apparatus may comprise the memory; and holding means for recording the resource information and communication setting information in said memory.

Further, the task may include a task execution request for requesting execution of a subsequent task to be executed subsequently to the execution of the task; and information for a destination of the executed result of the subsequent task.

The second management means may request, to the specified processing device, based on the communication setting information of the processing device recorded in the memory, execution of the task that includes a destination of the executed result of the received task. Alternatively, second management means may cause the processing device that requested the task demand to request direct task execution toward the specified processing device.

The process management apparatus may comprise a shared space module for generating shared space on the network wherein a plurality of said processing devices participate in or leave (exit) from the shared space at any time. In this case, the second management means acquires communication setting information for the processing devices participating in the shared space generated by the shared space module and current resource information from the processing devices, and listing this acquired information in said memory to put the acquired information into valid condition while putting the information listed for the processing device that left the shared space into invalid condition. In the simplest embodiment, "putting the information into invalid condition" may be achieved by merely deleting the information, however, it may be achieved by employing flag for representing "valid" or "invalid".

A computer system of the present invention comprises: processing devices each includes a function for executing a requested task and transfers the executed result to a destination designated by the requester of the task; and process management apparatus connected to the processing device via an internal bus. It is noted that the processing device and the process management apparatus are connected to a network via the internal bus, respectively.

It is noted that the process management apparatus comprises: first management means for allowing access to a predetermined memory in which resource information for representing task execution capability of the processing device connected to the network and communication setting information for enabling network communication with the processing device are listed; and second management means for specifying, upon receiving a task demand from any of the processing device through network communication, a processing device that is capable of executing the task by the resource information listed in the memory, wherein the second management means acquires the communication setting information for the specified processing device from the memory, and transfers, to at least one processing device from the specified processing device and the processing device that requested the task demand, the communication setting information for the other processing device, thereby allowing direct transfer of the executed result between the processing devices through network communication.

A device for distributed processing management of the present invention is adapted to be installed in a computer system adapted to be connected to a network to which a plurality of processing devices are connected, each of the processing devices includes a function for (i.e., is designed to be capable of) executing a requested task and transferring the executed result to a destination designated by the requester of the task, wherein the device for distributed processing management executes a predetermined computer program to cause the computer system to operate as: first management means for allowing access to a predetermined memory in which resource information for representing task execution capability of the processing device connected to the network and communication setting information for enabling network communication with the processing device are listed; and second management means for specifying, upon receiving a task demand from any of the processing device through network communication, a processing device that is capable of executing the task by the resource information listed in the memory, wherein the second management means acquires the communication setting information for the specified processing device from the memory, and transfers, to at least one processing device from the specified processing device and the processing device which requested the task demand, the communication setting information for the other processing device, thereby allowing direct transfer of the executed result between the processing devices through network communication.

A method for performing distributed processing of the present invention performs the distributed processing in cooperation between a plurality of processing devices and a process management apparatus, each of the processing devices has a function for executing a requested task and transferring the executed result to a destination designated by the requester of the task, and the process management apparatus communicates with each of the processing device via a network, comprising the steps of: obtaining, in the process management apparatus, resource information for representing task execution capability of the processing device connected to the network and communication setting information for enabling network communication with the processing device, and listing these obtained information in a predetermined memory; transferring, in any of the processing device, task demand to the process management apparatus; specifying, in the process management device that received the task demand, at least one processing device which is capable of performing the received task demand from the information recorded in the memory, and requesting the specified processing device to perform the task that includes the destination of the executed result thereby allowing direct transfer of the executed result without intervening the process management apparatus.

A computer program of the present invention is a computer program for causing a computer to operate as a process management apparatus adapted to be connected to a network to which a plurality of processing devices are connected, each of the processing devices includes a function for executing a requested task and transferring the executed result to a destination designated by the requester of the task, wherein the computer program causes the computer to function as: first management means for allowing access to a predetermined memory in which resource information for representing task execution capability of the processing device connected to the network and communication setting information for enabling network communication with the processing device are listed; and second management means for specifying, upon receiving a task demand from any of the processing device through network communication, a processing device that is capable of executing the task by the resource information listed in the memory, wherein the second management means acquires the communication setting information for the specified processing device from the memory, and transfers, to at least one processing device from the specified processing device and the processing device that requested the task demand, the communication setting information for the other processing device, thereby allowing direct transfer of the executed result between the processing devices through network communication.

BEST MODE FOR CARRYING OUT THE INVENTION

Firstly, the overall construction of the computer systems in accordance with the present invention is described.

<Overview of the Network Type Computer Systems>

Figure 1:
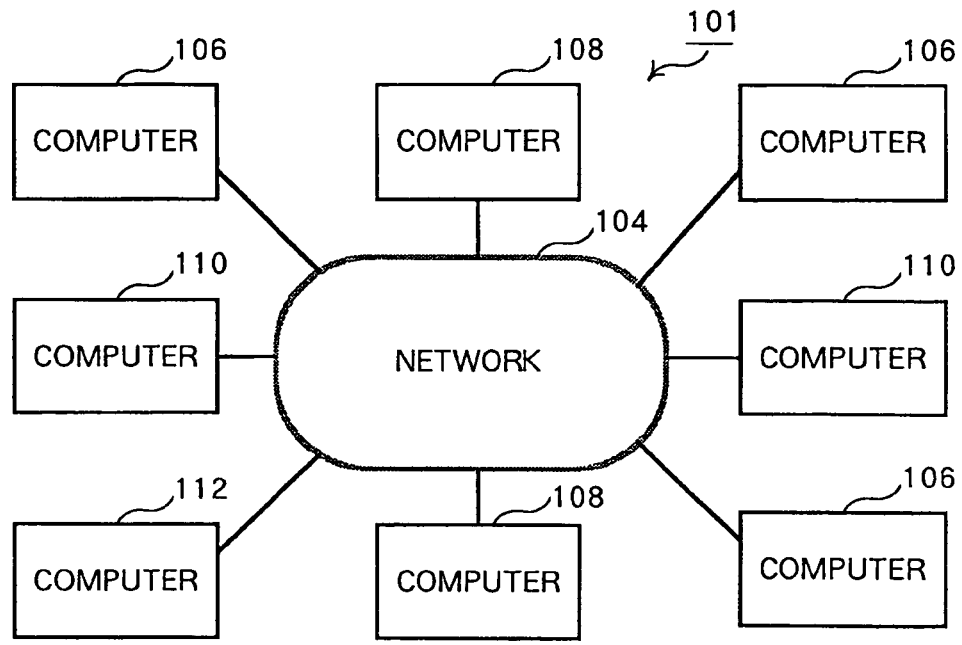
FIG. 1 is an exemplary diagram illustrating the whole computer systems to which the present invention is applied.

FIG. 1 illustrates the whole computer system 101 in accordance with the present invention. Computer system 101 includes network 104. An example of network 104 includes a local area network (LAN), global network like the Internet, and other computer networks.

Each of the computers can be connected to network 104 in any timing, respectively, and can perform bi-directional communication with other computers. An example of the computer includes personal computer 106, server computer 108, game console 110 with a communication function, PDA 112, and other wired or wireless computers and computing devices.

Each computer has a processor element (hereinafter referred as "PE") that has a common structure, respectively. These PEs all have the same ISA (Instruction Set Architecture) and perform predetermined processing in accordance with the same instruction set. The number of the PEs included within respective computers depends upon the processing power required by that computer for processing the task.

Since the PEs of the computer have homogeneous configuration, adaptability in computer system 10 can be improved. Each computer can perform the task requested from others using one or more of its PEs, or using a part of its PE. Therefore, it becomes less important to determine the computer for respective task. The executed result of the requested task is transferred by merely specifying the computer that has requested the task as a destination computer, or merely specifying a computer for executing subsequent task, as a destination computer. Therefore, it is possible to carry out distributed execution of each task easily among a plurality of computers connected to network 104.

Since each computer includes the PE(s) having a common structure and employing a common ISA, the computational burdens of an added layer of software to achieve compatibility among the processors is avoided. Further, many of the problems of heterogeneous networks can be avoided. Therefore, broadband processing can be achieved in this system 101.

<The Architecture of the Computer>

The architecture of the computer is clarified hereinafter. First, the constructional example of a PE provided in each computer is described with reference to FIG. 2.

Figure 2:
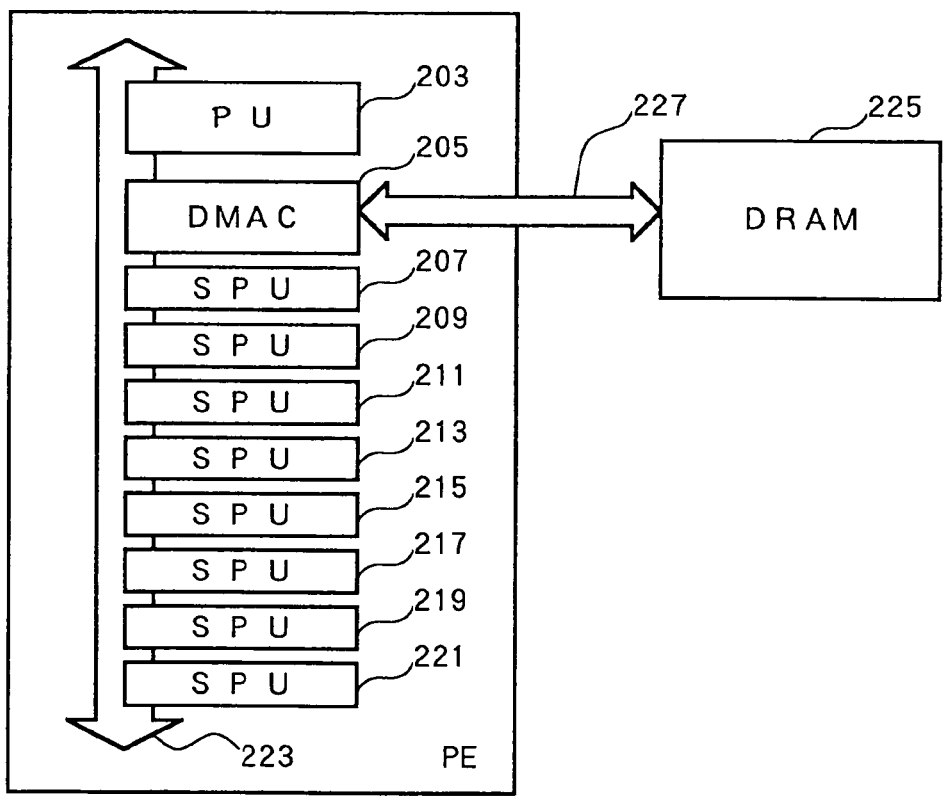
FIG. 2 is an exemplary diagram illustrating the construction of PE which is common to all the computers.

As shown in FIG. 2, PE 201 includes processor unit (PU) 203, direct memory access controller (DMAC) 205, and a plurality of sub-processor units (the SPUs) that are different from PUs, i.e., SPU207, SPU209, SPU211, SPU213, SPU215, SPU217, SPU219, and SPU221. PE bus 223 interconnects the SPU, the DMAC 205, and PU 203 mutually. PE bus 223 may be provided with a conventional architecture etc., or may be realized as a packet switch network. When implemented in a packet switch network, further hardware is needed, on the other hand, the amount of available bandwidth is increased.

PE 201 can be constructed using various methods for implementing digital logic. However PE 201 preferably is constructed as a single integrated circuit. PE201 is connected to dynamic random access memory (DRAM) 225 through high bandwidth memory connection 227. DRAM 225 functions as the main memory for PE201. Although the main memory preferably is DRAM 225, it could be implemented using other type of memories, e.g., as a static random access memory (SRAM), a magnetic random access memory (MRAM), an optical memory or a holographic memory. DMAC 205 provides, for PU203 and SPU207, direct memory access (DMA) for DRAM 225. DMA may be implemented, for example, by forming a crossbar switch in the preceding stage.

PU 203 controls SPU 207 etc., by issuing a DMA command to DMAC 205. In this case, PU treats SPU 207 etc., as an independent processor. Therefore, in order to control processing by SPU 207 etc., PU uses commands analogous to a remote procedure calls. These commands are called "Remote Procedure Call (RPC)." PU 203 performs RPC by issuing a series of DMA commands to DMAC 205. DMAC 205 loads the program (hereinafter referred as "SPU program") which is required for SPU to perform the requested execution of a task, and loads its associated data. Then, PU 203 issues an initial kick command to SPU to execute SPU program.

It is not strictly necessary for PU 203 to be provided as a network type processor, and PU 203 may contain a standard processor which can include a stand alone type processor as a main element. This processor reads and executes the computer program of the present invention recorded in DRAM 225 or a read only memory which is not illustrated in the drawings to form a communication module, while it provides various functions for management of SPUs 207 209, 211, 213, 215, 217, 219, and 221, which can be controlled by the processor, and for management of the SPUs which is controlled by other PEs or PEs which are controlled by a BE described in below.

Figure 3:
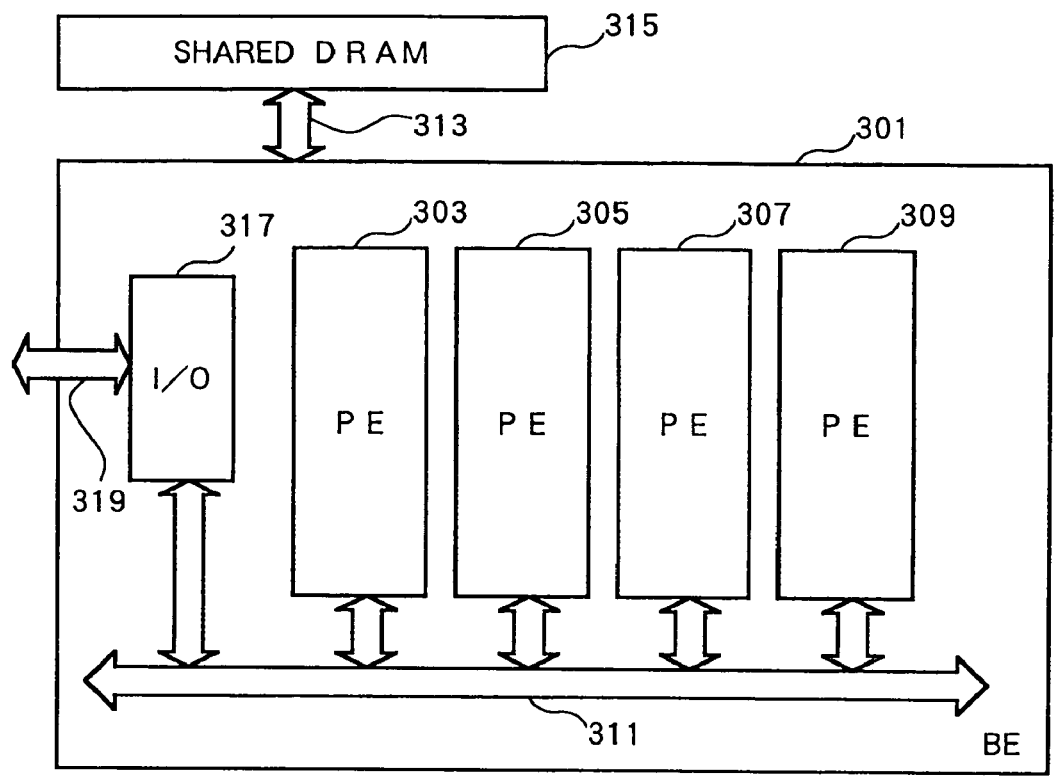
FIG. 3 is an exemplary diagram illustrating BE having a plurality of PE.

Some PEs, e.g., PE 201 illustrated in FIG. 2, can be combined to enhance the processing capability. For example, as shown in FIG. 3, a plurality of PEs may be combined and packaged into one or more chip packages etc., to provide a single computer. The computers having the above construction are called "broadband engine" (BE).

In the example shown in FIG. 3, four PEs (PE 303, PE 305, PE 307, PE 309) are contained in BE 301. These PEs communicate with each other via BE bus 311. These PEs and shared DRAM 315 are connected via broadband memory terminal portion 313. Instead of BE bus 311, communication between PEs of BE 301 can be achieved through shared DRAM 315 and the broadband memory terminal portion 313. In BE 301, all SPUs provided in one PE can independently, and under predetermined restriction condition, access the data in shared DRAM 315.

Input/output interface (I/O) 317 and an external bus 319 serve as a communication interface between BE 301 and other computer connected to network 104. I/O 317 is constituted of active devices such as a processor, and it controls communication between network 104 and each of PEs 303, 305, 307 and 309 in BE 301. Further, it receives various interruptions from network 104, and transmits them to the corresponding PE. Therefore, in the description below, these may be referred to "network interface". It is not necessary for such a network interface to be installed in BE 301, and it may be provided on network 104.

Although not illustrated in FIGS. 2 and 3, PE 201 or BE 301 can consist of a pixel engine for performing image processing, cache for image, and a display controller for a display etc. Such additional functions become important in the resource management described hereinafter.

The SPUs contained in PE or BE preferably are single instruction, multiple data (SIMD) processors. Under the control of PU 203, SPUs perform the task required via PE in a parallel and independent manner, and the result is output to the corresponding SPU designated by the request side. In the implement illustrated in FIG. 2, though a PE 201 has eight SPUs, the number of SPUs may be arbitrarily determined according to the processing capability to needed.

Figure 4:
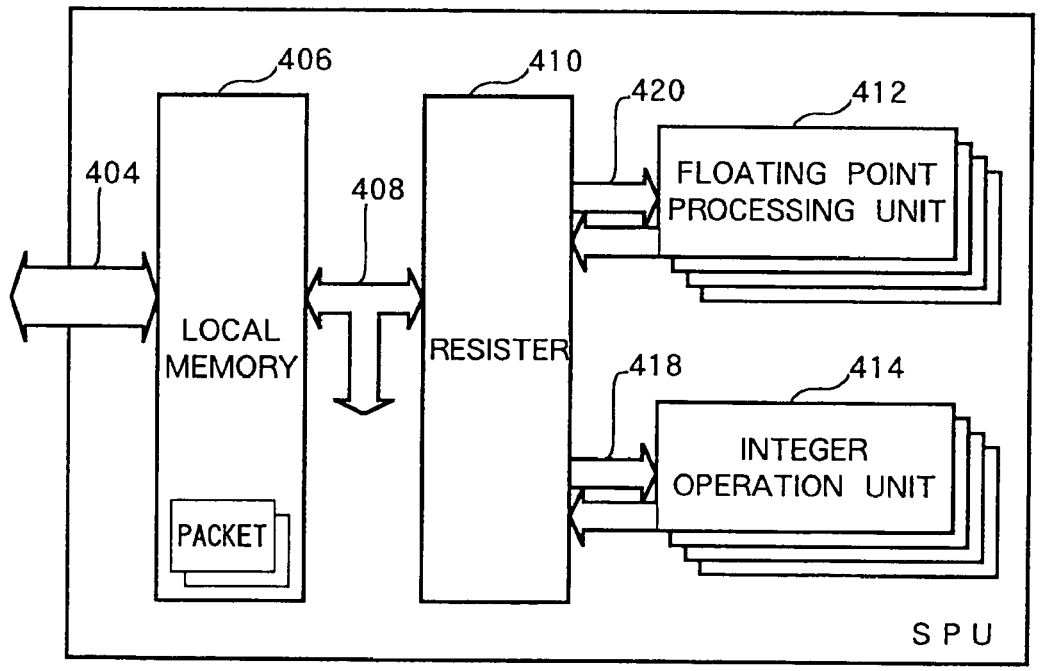
FIG. 4 is an exemplary diagram illustrating the structure SPU.

Hereinafter the structure of SPU is explained in detail. The SPU has the structure illustrated in FIG. 4. SPU 402 comprises SPU Local memory 406, register 410, a plurality of floating point processing units 412, and a plurality of integer operation units 414. SPU Local memory 406 serves as a local storage for storing data processed in SPU and various threads executed in SPU. The number of floating point processing units 412 and the number of integer operation units 414 can arbitrarily and previously be determined according to the necessary processing capability.

Local memory 406 preferably is constituted as SRAM. SPU 402 includes bus 404 for transferring the executed result of the various threads, task request, or the executed result of the task. SPU 402 further includes internal buses 408, 420, and 418. Internal bus 408 connects local memory 406 and the register 410. Internal bus 420 connects register 410 and integer operation unit 414, and internal bus 418 connects register 410 and floating point processing unit 412. In a certain preferred embodiment, the width of buses 418 and 420 from register 410 to floating point processing unit 412 or integer operation unit 414 is wider than that of buses 418 and 420 from floating point processing unit 412 or integer operation unit 414 to register 410. With the wider bandwidth of the above bus from register 410 to the floating point processing unit or integer operation unit 414, the larger data flow from register 410 is obtained.

An absolute timer is employed in the computer, though it is not illustrated in Figs. The absolute timer provides a clock signal to SPUs and other elements of PE which is both independent of, and faster than, the clock signal driving these elements. The absolute timer establishes a time budget for the performance of tasks by SPUs. This time budget provides a time for completing these tasks which is longer than that necessary for SPUs' processing of the tasks. As a result, for each task, there is, within the time budget, a busy period and a standby period. SPU programs are written for processing on the basis of this time budget regardless of SPUs' actual processing time.

<Communication Data>

The computers constructed as mentioned above request a task to other computers on network 104 when they are connected to network 104 at the arbitrary timing. Otherwise, the computers generate the communication data for transmitting the executed result of the tasks that have been requested to and performed by the computers. This communication data includes various kinds of information such as requested content of a task, a process program for executing a task, data, communication setting information at the designated computer to which the executed result or the subsequent task is provided. In this embodiment, these various kinds of information are packed in to the packets under the predetermined data construction, and the packets are delivered among the computers.

Generally, the packets are usually delivered via DRAM. For example, when the computer has only one PE as shown in FIG. 2, the packets are read from DRAM 225, when the computer has BE as shown in FIG. 3, the packets are read from shared DRAM 315, and the read packets are provided to local memory 406 of the respective SPU shown in FIG. 4, and directly processed in the SPU.

In this case, a program counter, a stack, and other software elements required for executing a process program may be included in local memory 406 of SPU.

It is noted that DRAM is not always essential for transferring packets. That is, when the computer has single PE only, as shown in FIG. 2, the packets may be directly loaded into local memory 406 of the respective SPU, on the other hand, when the computer has a BE as shown in FIG. 3, the packets may be directly loaded into local memory 406 of the respective SPU from I/O 317, thereby the packets are processed by the respective SPU.

Figure 5:
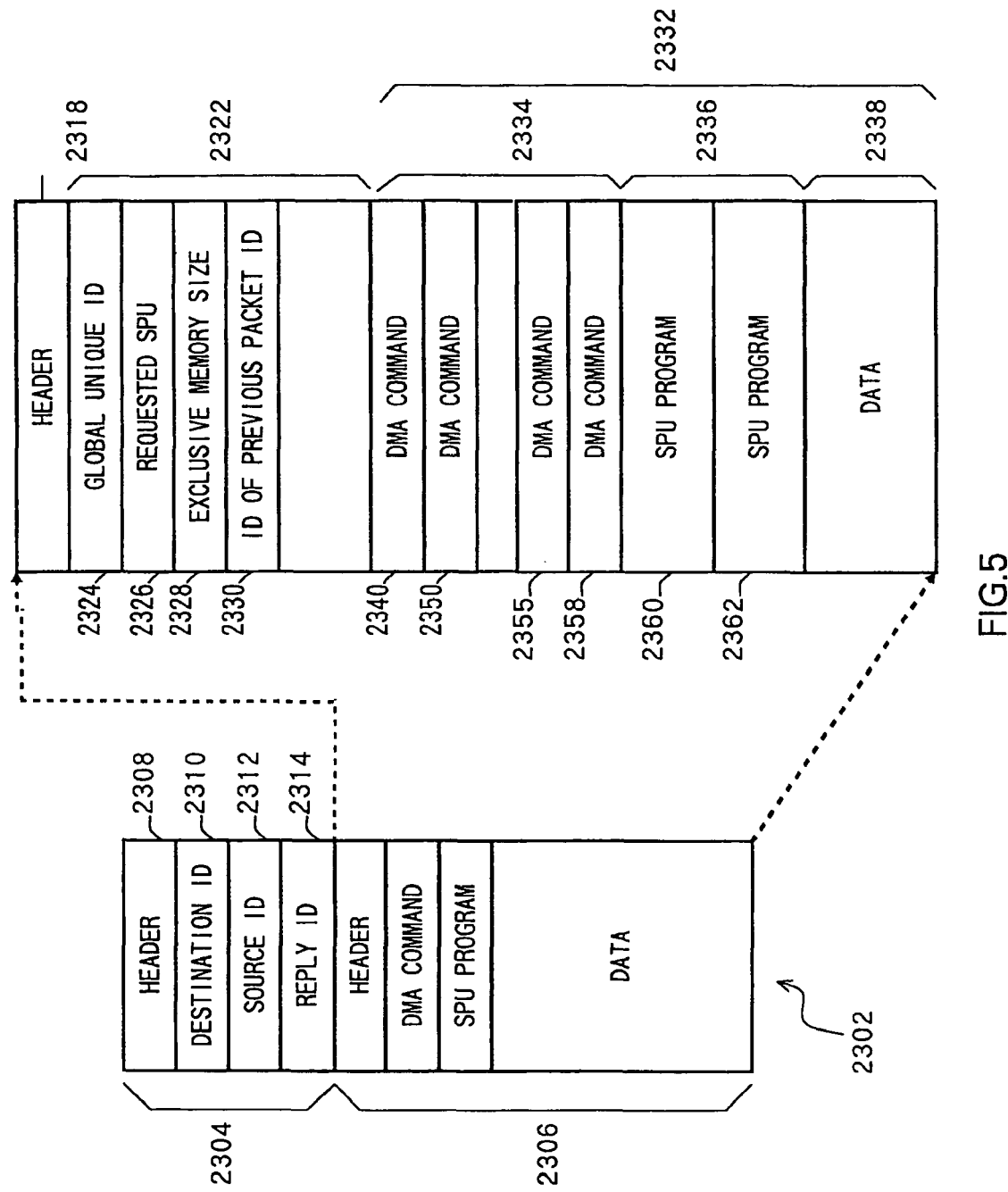
FIG. 5 is an exemplary diagram illustrating the packet which is transferred through a network.

FIG. 5 shows an exemplary construction of the packet. Packet 2302 comprises routing information section 2304 and body section 2306. Therefore, the information contained in routing information section 2304 is dependent upon the protocol of network 104. Routing information section 2304 contains header 2308, address ID 2310, source ID 2312, and reply ID 2314. Destination ID 2310 includes the identifier of SPU to which the task executed result of the task or the packet for executing the subsequent task is transferred.

When the identifier of the SPU belongs to one PE, it contains a network address of a network consists of a set of a PE and SPUs, when the identifier of the SPU belongs to one PE of a BE, it contains a network address of a network consists of a set of BE, PE and SPUs. Under the TCP/IP protocol the network address is an Internet protocol (IP) address. Source ID 2312 comprises the identifier of SPU from which the packet is transferred. A packet is generated from the SPU identified by this source ID 2314, and the packet is sent towards network 104. Reply ID 2314 contains the identifier of the SPU to which the query associated with the packet and task executed result or the subsequent task are transferred.

Body 2306 of the packet contains information that is not related to the network protocol. The details of body 2306 are shown in the area represented by the dotted line in FIG. 5. Header 2318 of body 2306 identifies the start of the body. Packet interface 2322 contains various information necessary for the packet's utilization. This information includes global unique ID 2324, SPU(s) 2326 designated for executing the task, exclusive memory size 2328 and packet ID 2330. It is noted that the SPU that previously processed the packet sets packet ID 2330 to the packet. SPU updates packet ID 2330 upon execution of the required task, and send it to network 104. Global unique ID 2324 is the information for uniquely identifying packet 2302 throughout network 104. This global unique ID 2324 is generated based on the basis of source ID 2312 (unique identifier of respective SPU in source ID 2312 etc.) and the time and the date of generation or transmission of packets 2302.

With exclusive memory size 2328, the memory size protected from other processing is established in required SPU that is related to DRAM required for execution of the task. Exclusive memory size 2328 is not essential for required data structure. When the memory size is previously specified, it is not necessary matter. The identifier of the SPU that executed the previous task among a group of tasks requiring sequential execution can be identified based on packet ID 2330 which is set in the previous executed task.

Implementation section 2332 contains the cell's core information. In this core information, DMA command list 2334, processing program 2336 required for execution of a task, and data 2338 are contained. Programs 2336 contain the programs to be run by the SPU(s) e.g., SPU programs 2360 and 2362, and data 2338 contains the data to be processed with these programs.

When a processing program required for task execution exists in the SPU to which the task is transferred, processing program 2336 is not needed anymore.

DMA command list 2334 contains a series of DMA commands required for starting of a program.

DMA commands 2340, 2350, 2355, and 2358 are contained in these DMA commands. The example of these DMA commands 2340, 2350, 2355, and 2358 are shown in FIG. 6.

Figure 6:
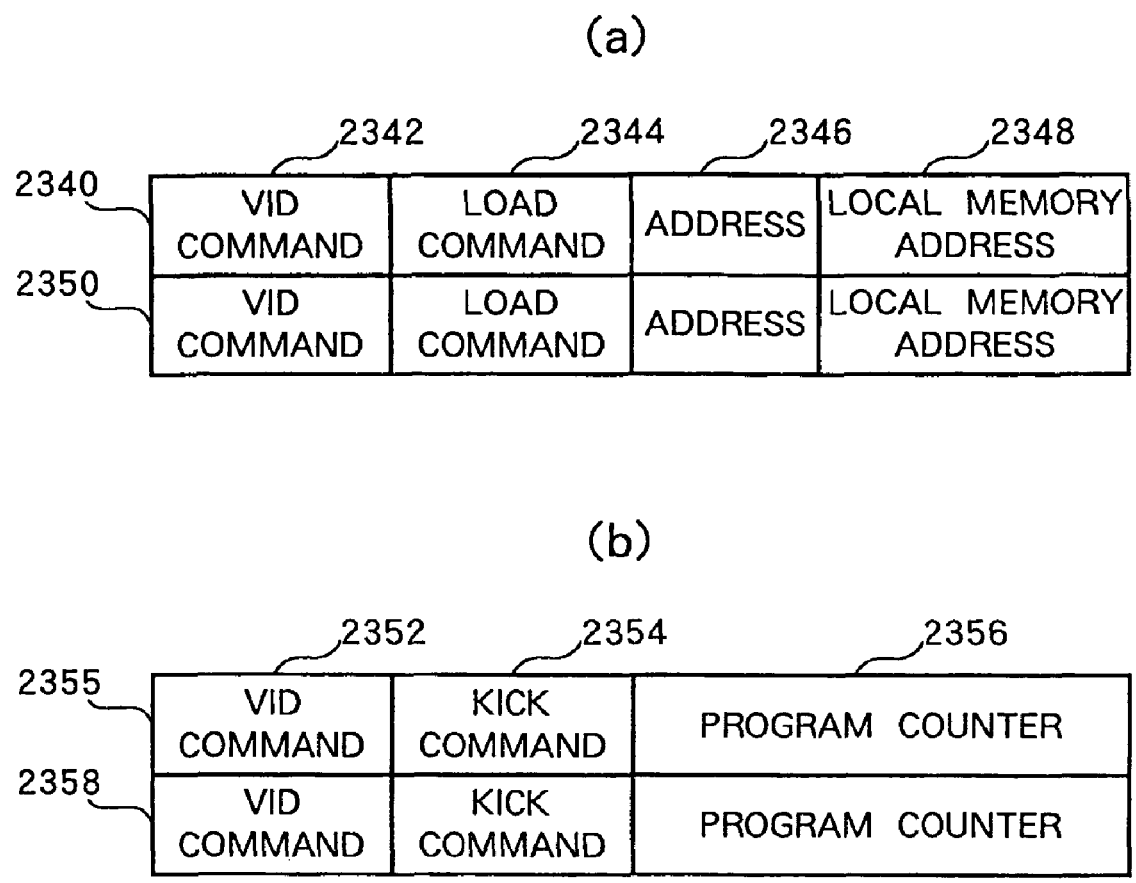
FIG. 6 illustrates an exemplary DMA command contained in a packet, FIG. 6 (a) illustrates a DMA command containing a command for loading the program etc., in the local memory of SPU and FIG. 6 (b) illustrates a DMA command containing a kick command for kicking a program.

That is, as shown in FIG. 6 (a), VID command 2342 is contained in DMA command 2340. VID command 2342 is a virtual ID of SPU which is related to the physical ID of DRAM 225 when the DMA command is issued. Load command 2344 and address 2346 are also contained in DMA command 2340. Load command 2344 is a command for instructing a SPU to read particular information from DRAM 225 for recording it in local memory 406. Based on address 2346, the virtual address in DRAM 225 which includes this particular information is given. This particular information may be processing program 2336, data 2338, or other data. Address 2348 of local memory 406 is contained in DMA command 2340. Due to this address, the address of local memory 406 which is estimated to be capable of loading all the information currently recorded in the packet is identified. This applies to DMA command 2350.

DMA command 2355 illustrated in FIG. 6 (b) contains a kick command. "Kick command" is a command issued by PU to the designated SPU to initiate the execution by SPU program in the packet. VID command 2352, kick command 2354 mentioned above, and program counter 2356 are contained in DMA command 2355. In this description, "VID command 2352" is a command for identifying SPU to be kicked. Kick command 2354 gives an associated kick command, and program counter 2356 gives the address for the program counter for execution of a SPU program. This applies to the DMA command 2358.

<Exemplary Operation>

An exemplary operation of computer systems 101 shown in FIG. 1 is described below.

Figure 7:
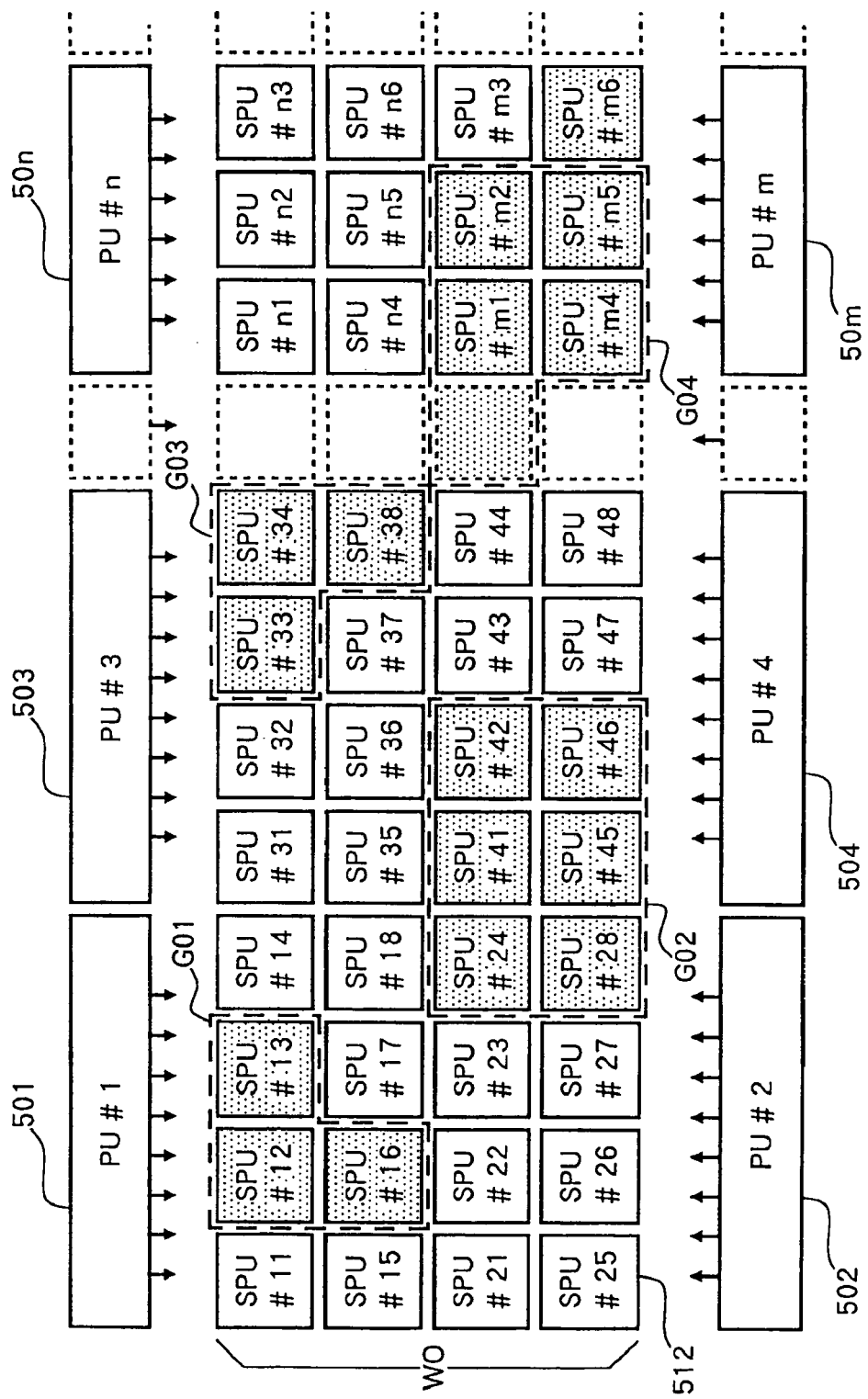
FIG. 7 is an exemplary diagram illustrating an information integrated system which comprises a number of SPUs.

As mentioned above, each computer connected to network 104 have PE(s) of a common structure, and common ISA. Therefore, the difference between architecture of the computers connected to network 104 is accommodated. Further, as shown in FIG. 7, in network 104, large scale information processing integrated system WO, in which a number of SPUs in each PE respectively operates as "Cell" for the information processing, is formed.

Each SPU 512 in the large scale information processing integrated system WO is physically managed by PU 501, 502, 503, 504, 50n, and 50m to which SPU 512 it self belongs, and independently operates as an independent SPU, or SPUs 512 are grouped and each SPU cooperates with other SPUs. However, in view of logical concept, no wall is provided between PUs, therefore, SPU(s) managed by one PU and other SPU(s) managed by other PU(s) can also be grouped. When grouped in the form described above, a task can be executed by distributed processing in the SPUs belonging to one group.

As an exemplary form of distributed processing, a common space which can be commonly accessed between groups can be provided. A user operating a certain computer can access the common space through the resource of one or more SPU(s) of the computer. In FIG. 7, G01-G04 show the group of a plurality of SPUs which is provided in large scale information processing integrated system WO, respectively.

Figure 8:
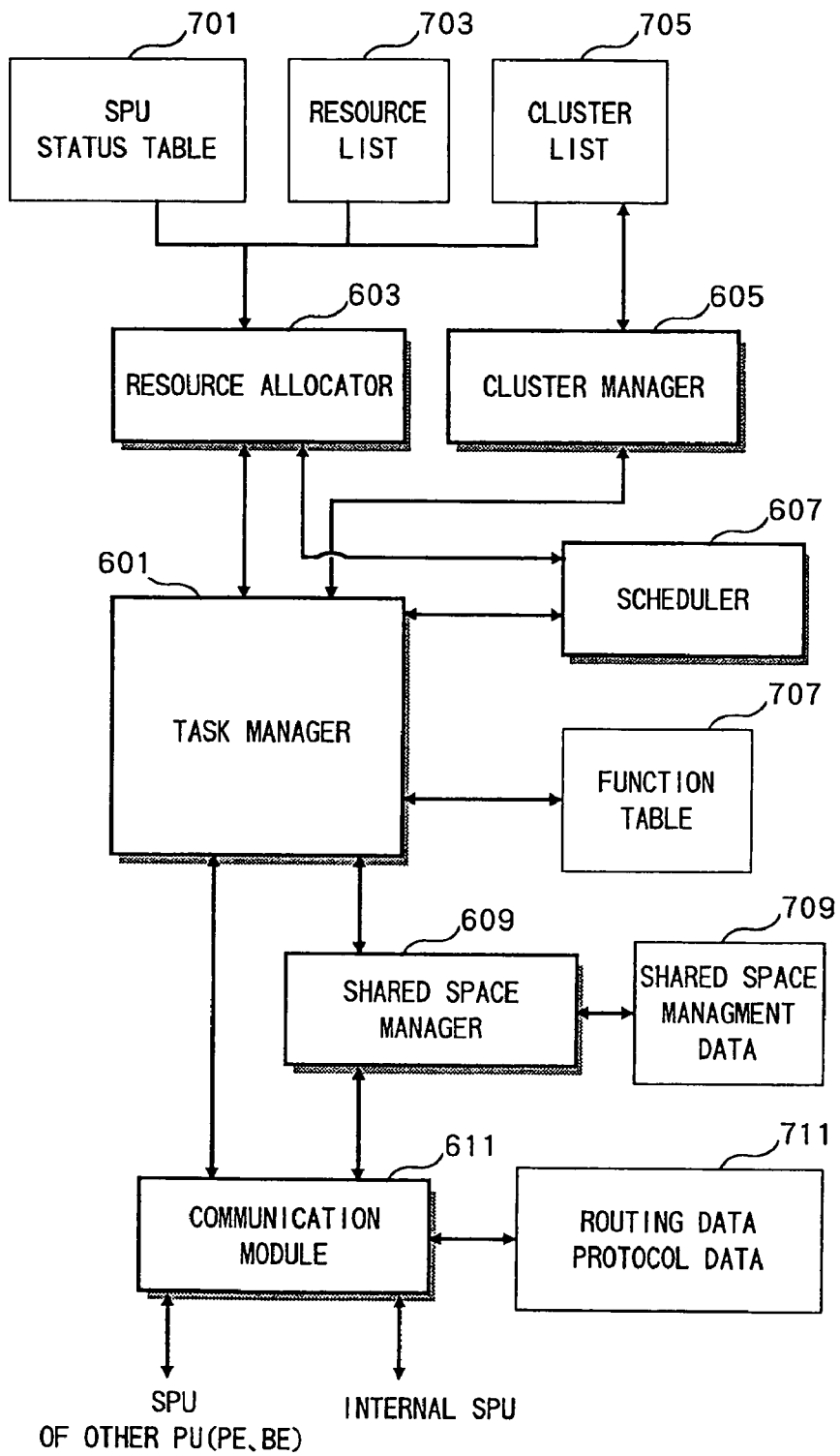
FIG. 8 is an exemplary diagram illustrating functions and tables etc., generated in PU.

Various functions are formed in a PU in order to allow an efficient distributed processing in such large scale information processing integrated system WO. FIG. 8 is a diagram of the various lists, tables and functions formed in a PU in collaboration with the program of the present invention.

Task manager 601, resource allocator 603, cluster manager 605, scheduler 607, share space manager 609 that becomes an example of a share space module, and communication module 611 are formed in a PU. Communication module 611 performs the two way communication with internal SPU(s) via PE bus 233 (FIG. 2) while controlling the procedure of two way communication between other SPU of a PU (PE/BE) via PE bus 233 and network 104. Communication module 611 refers to table 711 to which the routing data and protocol data are recorded, and performs the above mentioned control.

Cluster manager 605 performs processing for performing clustering of all the SPUs that can communicate via communication module 611 and task manager 601. This processing is specifically described hereinafter. Firstly, the present processing capability and the kinds of the tasks that can be processed by SPU are obtained. For example, the above capability and the kinds of the tasks are obtained through the monitoring thread performed in SPU and the monitoring thread performed by task manager 601. Further, the combination of the kind of the task which can be performed in each SPU and processing capability of each SPU is clustered per each kind or size of the task which is estimated to be performed. Then, the above combination is listed in cluster list 705.

Figure 9:
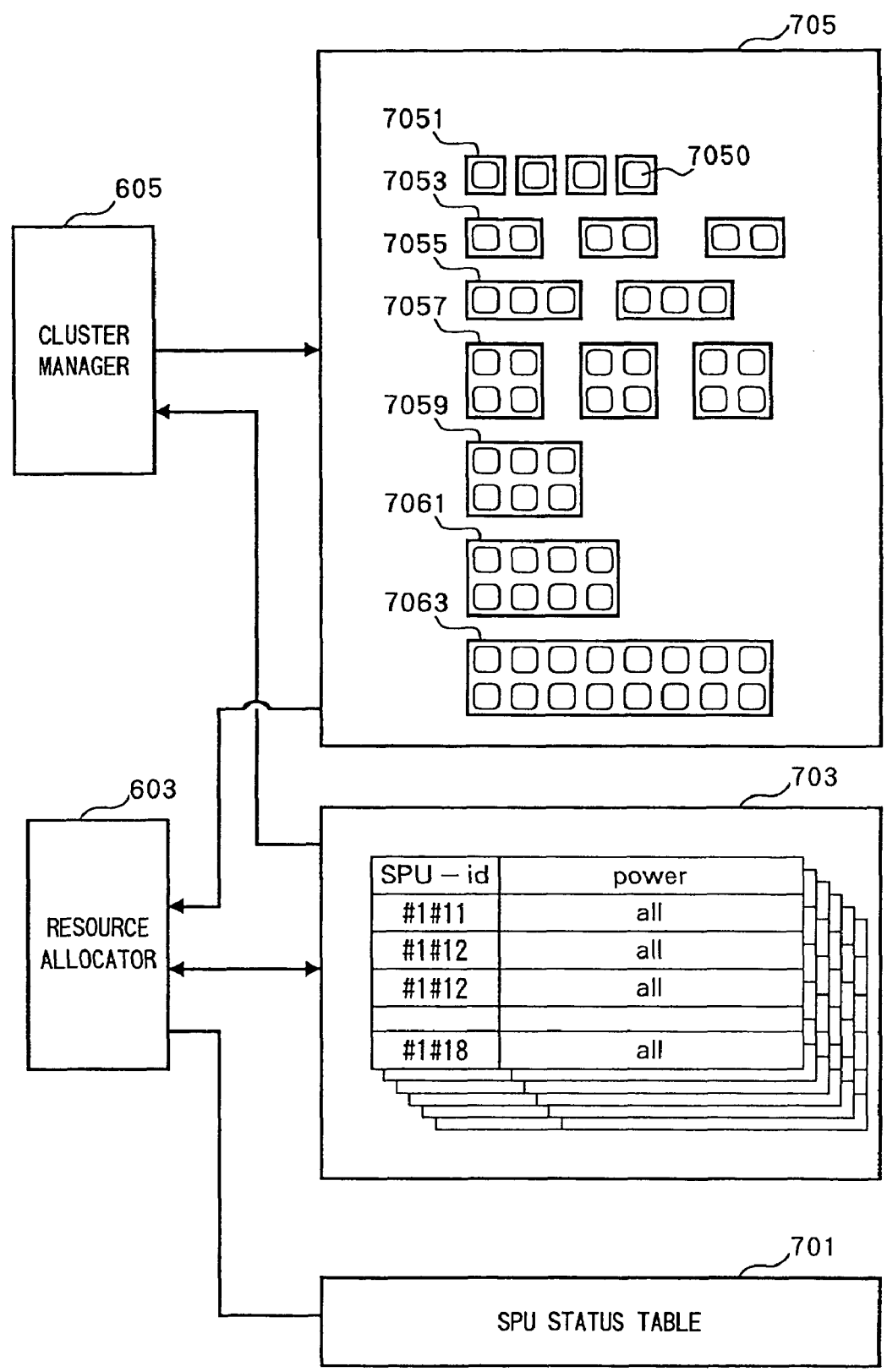
FIG. 9 is an exemplary diagram illustrating embodiment representing the use of a cluster table and a resource list.

The contents of cluster list 705 are shown, for example in the upper row of FIG. 9. The minimum unit of a cluster corresponds to one SPU 7050. In the embodiment illustrated in FIG. 9, two or more kinds of SPU clusters 7051 which consist of one specific SPU, respectively, and SPU clusters 7053, 7055, 7057, 7059, 7061, and 7063 which consist of combination of two or more SPUs are listed. SPU_id for identifying SPU, the identifier (PU-ref) of PU to which the SPU belongs, and the identification information (valid/invalid) representing whether it can be assigned or not are recorded, respectively. In FIG. 9, "valid" represents that it can be assigned, and "invalid" represents that it can not be assigned.

Figure 10:
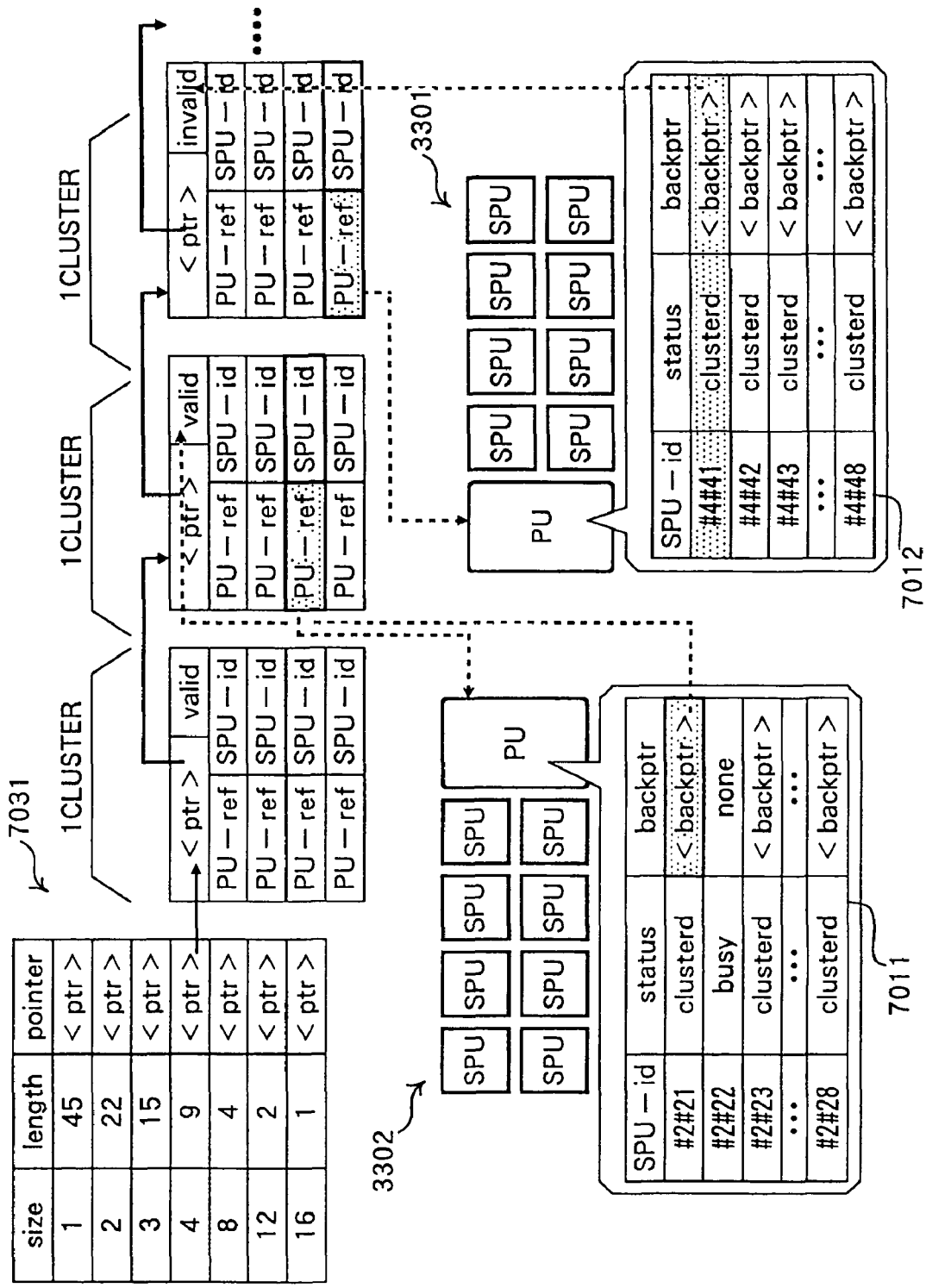
FIG. 10 is an exemplary diagram illustrating the relation between a resource list, an SPU status table, and a cluster list.

The upper portion of FIG. 10, illustrates the example of SPU cluster consisting of combination of four SPUs. SPU cluster is created based on table 7031 which is previously defined according to the number (size) of SPUs and task size (length). In the example of upper portion of FIG. 10, since the number of SPUs is four, the SPU cluster is generated based on the data "4" described in "SIZE" of table 7031. The recorded contents of cluster list 705 are updated at any time. The number (size) of SPU(s) in table 7031 is not limited to numerical value, rather, it may be expressed by, for example, a function representing a ratio against whole number of clusters.

An example of the SPU status table 701 is illustrated in the lower portion of FIG. 10. The status information (status) is recorded in SPU status table 7011 for every SPU_id in PU3302 identified based on "PU-ref" in a certain cluster. Status information shows whether the SPU is currently clustered or not, and shows whether the SPU is in operation or not. It is noted that "busy" shows that the SPU is in operation, thus "none" shows that a back pointer is not necessary.

Figure 11:
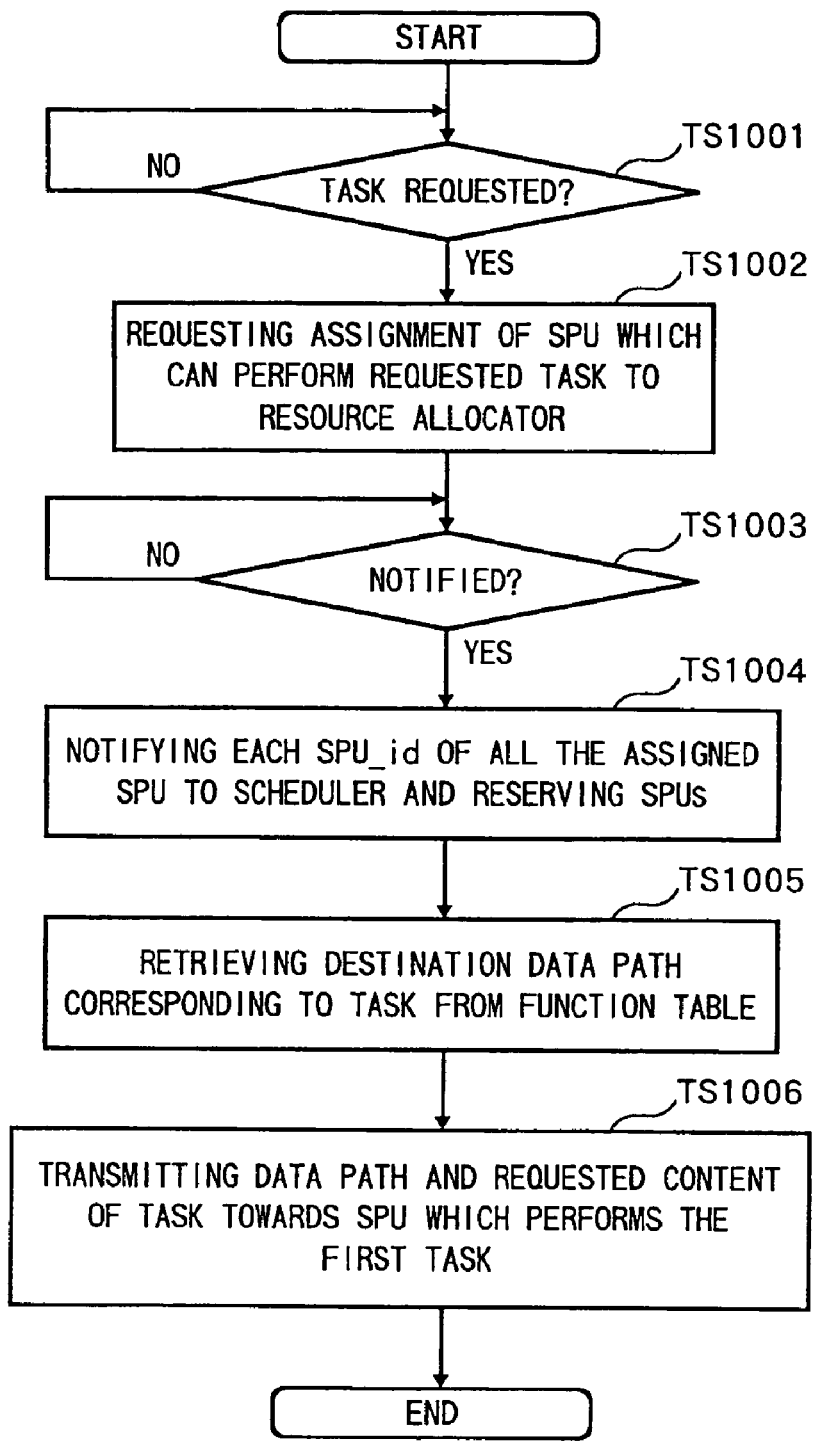
FIG. 11 illustrates a processing procedure executed in the task manager formed in PU.

Task manager 601 performs processes according to the procedure illustrated in FIG. 11. When a task request (task demand) is received from SPU (TS1000:Yes), the task manager requests, to resource allocator 603, assignment of SPU cluster which can perform the requested task (TS1002). When the information of SPU, which belongs to the assigned SPU cluster, is notified from resource allocator 603 (TS1003: Yes), each SPU_id of all the assigned SPUs is notified to scheduler 607 to reserve the notified SPUs (TS1004), thus avoiding competition of the operation of SPU with other processes.

With reference to the data path that connects a call function between one or more processing programs described in the task, and with reference to function table 707 generated from the position information of assigned SPU, the data path is retrieved (TS1005). It is noted that the executed result corresponding to the kind of task to be performed by the SPU is designated to the data path. Thereafter, the requested content of the task and the data path are transmitted towards the SPU that performs the first task (TS1006). The examples of description of the task are described below.

<Graphic processing>
    <program="program for video" name="video" />
    <program="program for audio" name="audio" />
    <program="program for packaging into packet" name="packet" />
    <sub from="video.Video_OUT" to="packet.Video_IN" />
    <sub from="auido.AUdio_OUT" to="packet.Autdio_IN" />
    <data file="video_data" to="video.Data_IN" />

-continued

```
    <data file="audio_data" to="audio.DATA_IN" />
    <data file="packet_data" from="packet.DATA_OUT" />
</Graphic processing>
```

The requested content of the task and transmission of the data path may be performed directly by a PU, i.e., task manager 601. Alternatively, these may be performed by recording data path etc., on the local memory of the SPU which issued the task demand, creating a packet in the SPU, and transmitting the packet to a network via PE bus.

Alternatively, the requested contents of the task and the data path of the SPU which performed the task demand may be transmitted to the SPU which is specified by SPU_id of the assigned SPU to directly establish a communication path from the specified SPU to the SPU which issued task demand.

Task manager 601 transmits the schedule information, the status information, and the resource information for the SPU which belongs to the task manager 601 to other BE, PE, or PE through communication module 611. Further, the task manager 601 obtains such information for other BE, PE, or SPU which belongs to PE. The obtained status information is recorded in SPU status table 701 via resource allocator, or directly by the task manager. Similarly, the resource information is recorded in resource list 703.

Resource information represents a type of process which can be currently processed by each SPU, and degree of processing capability of the same. This resource information is recorded in resource list 703 for every SPU_id. As described above, the SPUs have common structure in all computers, however, the kind of process available for SPU may vary based on whether the processing engine added to the PE to which the SPU belongs is provided or not, and may vary based on kinds of such a processing engine. In case any kind of processing is available as long as an SPU program is loaded, the kind of processing is represented as "all", as shown in FIG. 9. When there is a kind of specific processing other than "all", it is represented as "image processing only", "voice processing only", or "packaging only". In case the value of processing capability is known and common in all SPUs, listing of the value of processing capability can be eliminated.

As described above, the schedule information is information for reserving SPU(s). Scheduler 607 records the schedule information in the time table (not shown) for each SPU, and notifies to task manager 601 the recorded information, if needed.

Figure 12:
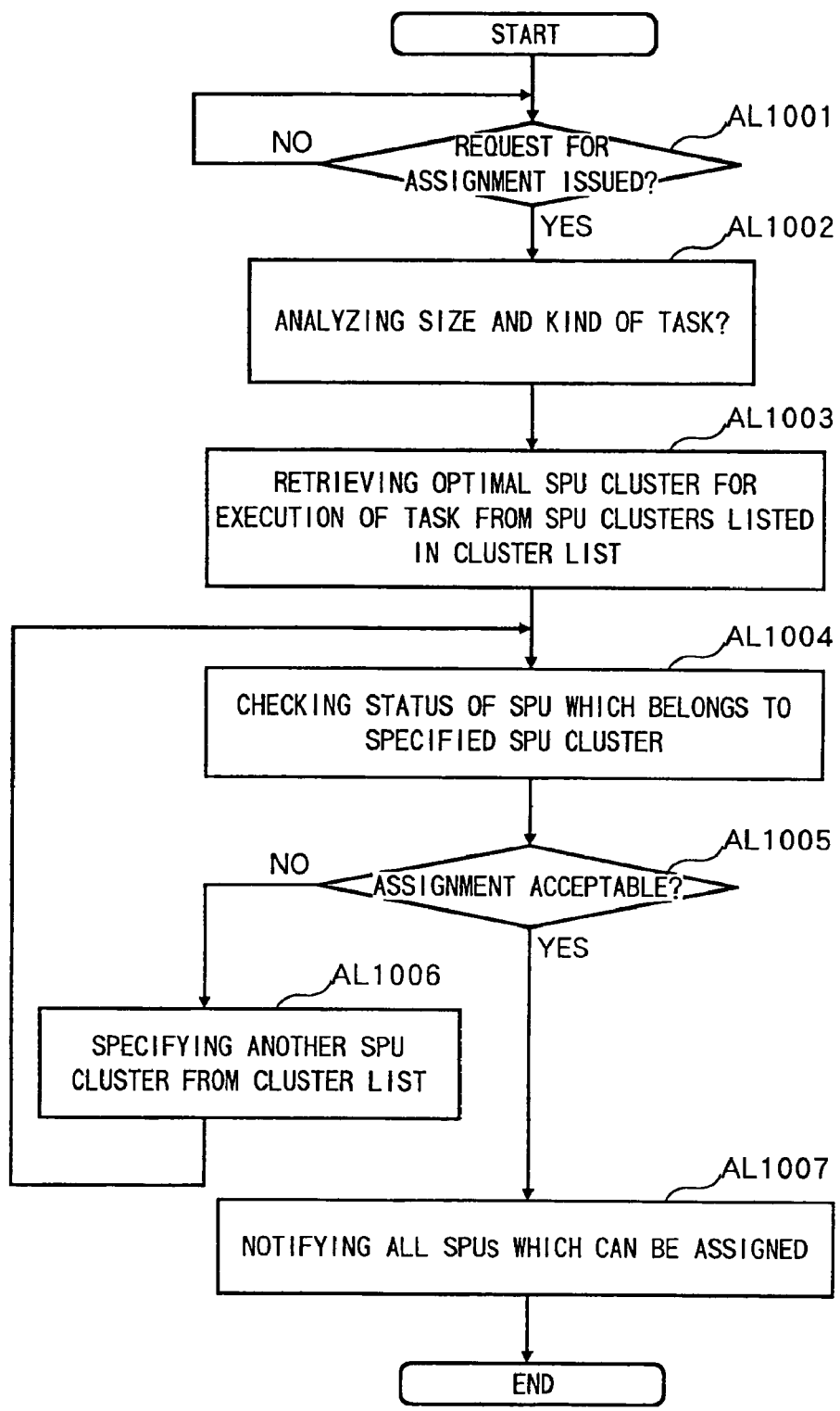
FIG. 12 illustrates a processing procedure executed in the resource allocator formed in PU.

Resource allocator 603 performs the processes according to the procedure shown in FIG. 12. That is, if a request for assignment is issued through task manager 601 (AL1001: Yes), resource allocator 603 will analyze the size and kind of the task (AL1002). Thereafter, the optimal SPU cluster for execution of the task is retrieved from SPU clusters listed in cluster lists 705 (AL1003).

Examples of search criteria for the optimal SPU cluster are described below. (1) When the argument of search is task size only, i.e., when the value of processing capability is common to all SPUs, in a very simple embodiment, a cluster having matching cluster size is selected from the cluster list, and the first cluster among the clusters having the value "valid" for the identification information in the cluster list is decided to be assigned. Alternatively, the optimal SPU cluster can be decided based on network distance. In this case, as to any combination between SPUs constituting the cluster, the network distance (the number of hosts to be routed to arrive the counterpart SPU) is calculated, and a cluster list sorted in ascending order of maximum value of the network distance is generated. Then, the first cluster which has the value "valid" for the identification information in the cluster list is assigned. (2) When the argument of search is a task size and kind of the task, the cluster list is selected based on the task size, then, checking, as to each cluster having the value "valid" for the identification information and from the first cluster in the cluster list, whether an SPU which has an ability for the necessary task processing is included in the cluster list. Further, the cluster including an SPU group which can perform the task processing to be processed first is returned.

After specifying the optimal SPU cluster as mentioned above, resource allocator 603 checks the status of the SPU which belongs to the specified SPU cluster with reference to SPU status table 701 (AL1004). When the assignment is not acceptable because of the "busy" status etc., (AL1005:No), another SPU cluster is specified from cluster list 705 (AL1006), and returning to the processing of AL1004. When the assignment is acceptable, (AL1005:Yes) all SPUs which can be assigned are notified to task manager 601 (AL1007).

Based on shared space management data, the shared space in which two or more SPUs can participate and leave arbitrarily is generated in a part of the area of the large scale information processing integrated system WO shown in FIG. 7. Shared space management data is an address etc., of the region to which a plurality of SPUs can access simultaneously, for example. When shared space is generated, it is necessary to share the above mentioned status information, resource information, and schedule information. Then, shared space manager 609 transmits SPU status table 701 and resource list 703 to PU which manages SPU participating in the shared space for synchronizing the updating period of the recorded contents. Alternatively, cluster list 705 may be mutually transmitted between PUs.

The PU lists, in the predetermined memory area, the identification information of the SPUs participating in the shared space and the communication setting information of each SPU, further, the PU then allows them to be available for use ("valid"). On the other hand, as to the SPU which has left the shared space, the status of the listed information is changed to "invalid".

Figure 13:
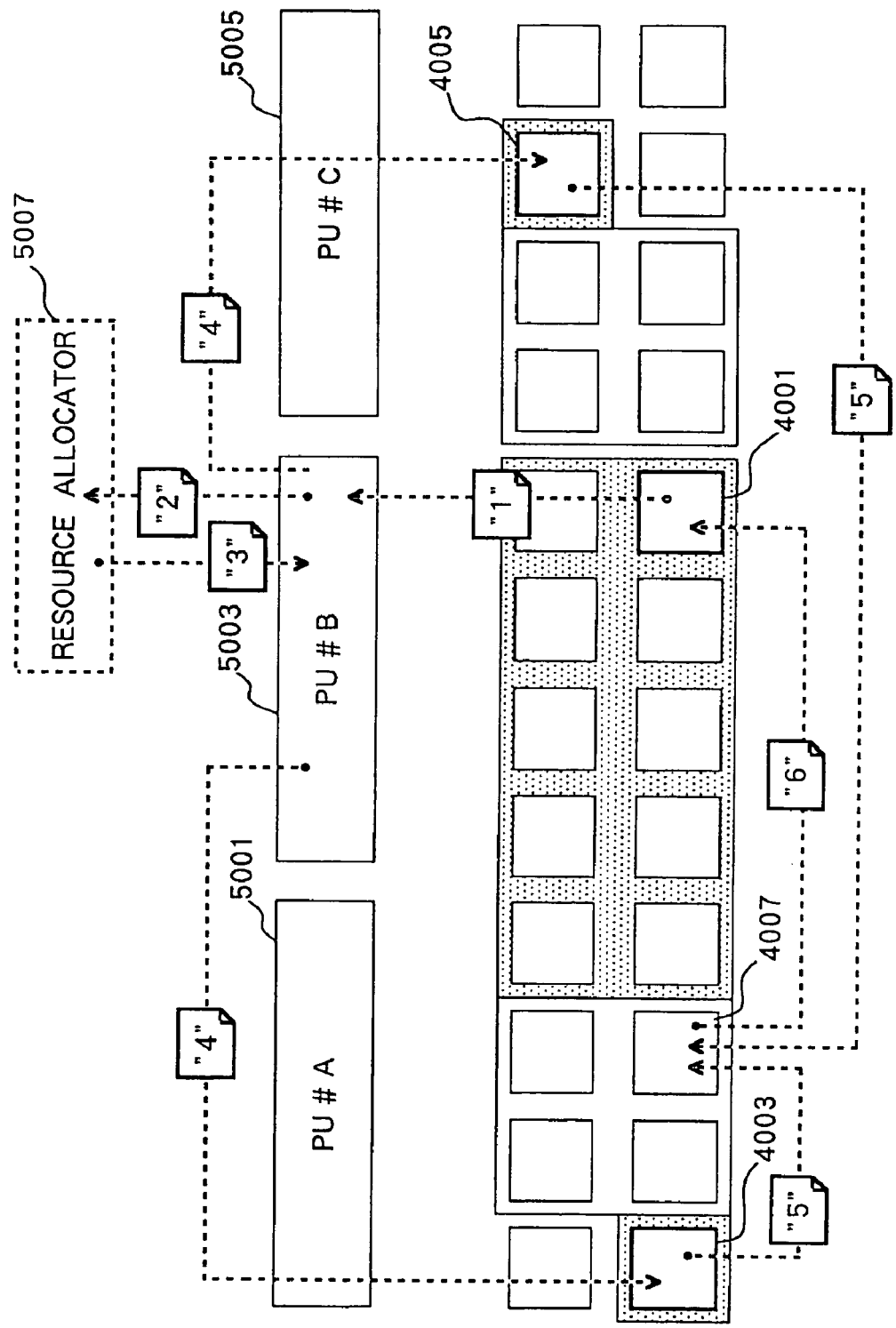
FIG. 13 is an exemplary diagram illustrating an overall processing outline using a task manager.

FIG. 13 illustrates the example of the above mentioned overall processing. In FIG. 13, the screened portion represents the clustered SPUs. Resource allocator 5007 in nature is provided in each PU, however, in order to describe the process in the shared space over a plurality of PUs, for brevity and clarity, resource allocator 5007 is described as one common resource allocator which resides outside of PU.

This embodiment illustrates an exemplary flow in which, from a given SPU 4001 constituting the large scale information integrated system to PU (#B) 5003, a task request is issued in the form of packet. It is noted that, in this embodiment, the task request is for requesting synthesizing and packaging of video data and audio data, and for returning the result to SPU 4001.

If this task demand is transferred to PU (#B) 5003 ("1"), PU (#B) 5003 requests assignment of the optimal SPU cluster for execution of that task to the resource allocator 5007 ("2"). Resource allocator 5007 determines, with reference to the resource information of resource list 703, that SPU4003 is suitable for video data, and SPU4005 is suitable for audio data, and SPU4007 is suitable for the packet program. Then, the above determination is notified to PU (#B) 5003 ("3"). To the network address of the PU which manages the SPU, PU (#B) 5003 prepares for transferring the packet, which includes the communication setting information of SPU 4007, to each SPU 4003 and 4005. It is noted that SPU 4007 is the destination SPU to which the requested content of the first task and the executed result of the task is transferred.

Therefore, the program for video is transferred to SPU4003 of PU (#A), the program for audios is transferred to SPU4005 of PU(#C)5005, and the packet program is transferred to SPU4007 of PU#A. Then, data path is set in each program.

Data path is acquired by search of function table 707 based on the data flow described in the task, using the processing program assigned to each SPU as a key. For example, a program for videos is described below.
"video.VIDEO_OUT->packet.VIDEO_IN"

Based on the assignment information for SPU, this result is translated as follows. "PU#A:SPU#●:VIDEO_OUT->PU#B: SPU#○:VIDEO_IN"

Then, the identifier of a designated destination is added. In an exemplary form of the identifier of a destination, when the existing protocol such as TCP and UDP is used, PU and an IP address are related, further, SPU and a communication port number are related. Alternatively, an individual IP address is assigned to each SPU or PU. Alternatively, the existing protocol is used by specifying PE, BE, or a computer of the destination by an IP address, and recording them in local storage. Other method for designating address other than the method using an IP address, for example, the address of the network to which data is allowed to be transferred may be designated by a processor identifier for each SPU. Due to the above procedure, for example, the data portion of the packet including destination of video data is described as follows.
"192.168:0.1:10001:VIDEO_OUT->192.168.0.2:10002: VIDEO_IN"

Then, a packet, corresponding to the protocol to be used and including such data portion and a header for causing the packet to be transferred to SPU 4003 and 4005, is generated. Further, the generated packet is transferred to network 104 through the network interface illustrated in FIG. 3 ("4").

In response to interruption from a network interface, PU (#A) 5001 which manages SPU 4003 and PU (#C) which manages SPU 4005 respectively receive a packet, and write the content of the packet in the local memory of SPU 4003 and 4005, respectively. SPU 4003 and 4005 thereby perform the requested task. The executed results of the task executed by SPU4003 and 4005 are packaged into a packet with the program for the packet, and the packet is transferred to a designated destination, i.e., SPU4007 ("5"). SPU 4007 is a program for package into packet, and it packages video data and audio data, then, the resultant is transmitted to SPU4001 which is a destination designated by each SPU4003 and 4005 ("6"). Thus, SPU4001 can acquire the executed result corresponding to the task demand.

Alternatively, each PU may specify the SPU which should receive the packet by analyzing only the header information of the packet, and the PU may obtain the required packet data for each SPU from the network interface or DRAM.

In the above embodiment, the program for packaging is packaged into a packet with the executed result of SPU 4003 or SPU 4005, and the packet is transferred to SPU 4007 to execute the program. Further, as to SPU 4003 and SPU 4005, the program of the SPU which finished execution of the task prior to the other SPU is executed in SPU 4007, and waiting the executed result of other SPU (SPU to which the program for audio or video is transferred). However, other than the above embodiment, further alternative embodiment described below may be provided.

In this alternative embodiment, similar to the video program and the audio program, the message represented as "4" causes a program for packet to be executed by SPU 4007, and SPU 4007 waits the executed result packet from SPU 4003 and SPU 4005. SPU 4003 and SPU 4005 package the executed result into a packet, and transfer it to SPU 4007. Thus, two embodiment is available, in one embodiment all the programs are previously transferred to SPU4003, 4005 and 4007 for continuously flowing data, in another embodiment, the SPU which finished the task in the progress of the processes, prior to other SPU packages the executed result and subsequent program into a packet.

Figure 14:
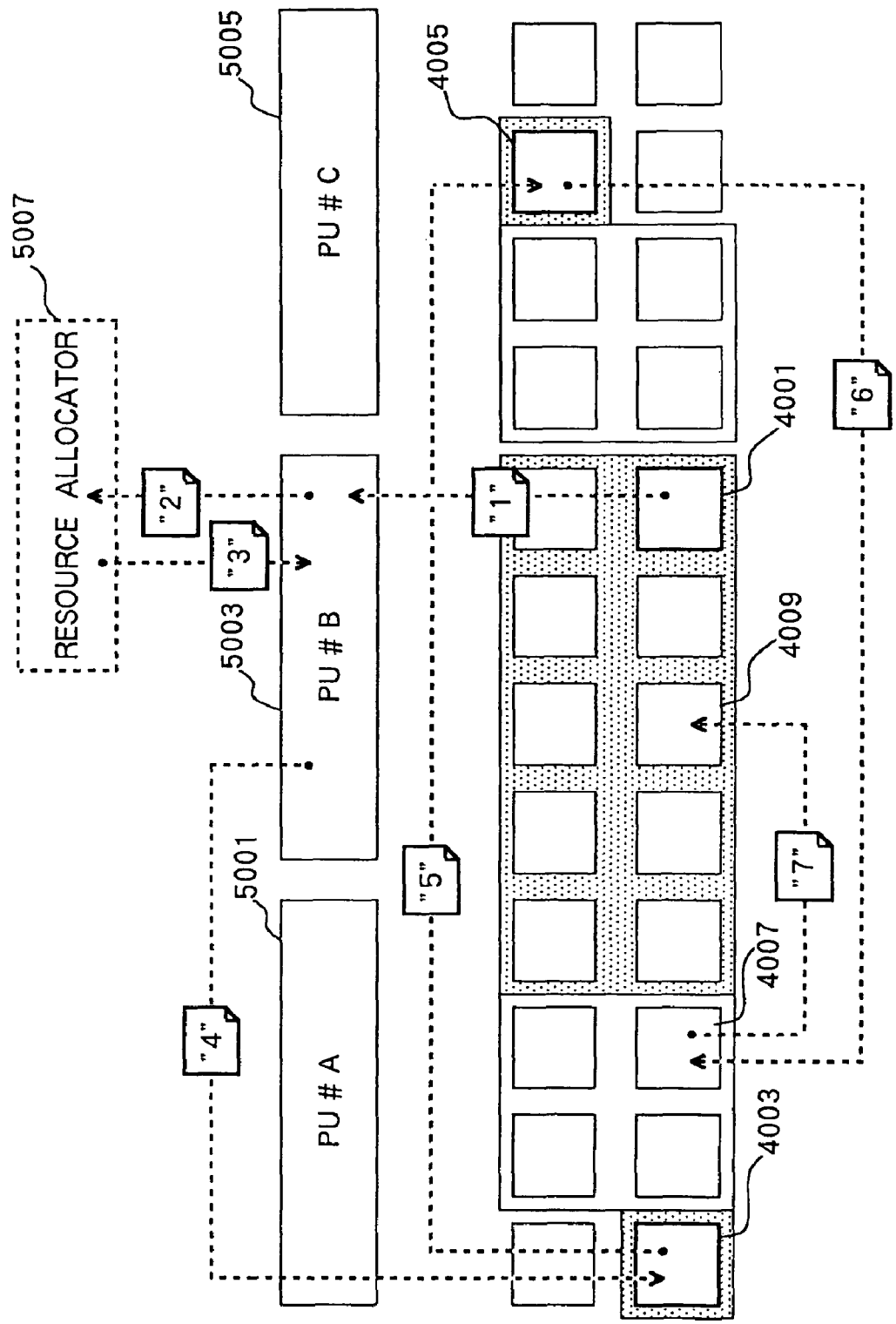
FIG. 14 is an alternative exemplary diagram illustrating processing outline using a task manager.

FIG. 14 shows an embodiment similar to the embodiment illustrated in FIG. 13 in which a packet from SPU 4003 causes SPU 4005 to be operable. Further, The executed result and SPU program, which are transferred to SPU4007 from SPU 4005, are transferred to SPU4007 ("6"). After packaged by SPU 4007, these are transferred to other SPU 4009, not to SPU 4001 which requested the task, which has been clustered into the same group as SPU4001 ("7").

As shown in the above embodiment, PU requests resource allocator 5007 to specify the optimal SPU, and transmits the request content and the destination of the task to the specified SPU. Thereby the request of future tasks and the executed result are transferred only by the SPU, i.e., without any PU. Therefore, the overhead of PU for the request for the task is avoided.

Since clustering is performed for each previously estimated task size, and the optimal SPU cluster is assigned at the time of task request, the time necessary for assigning SPU is also decreased. Such an effect is significantly important for the application in which real time processing is required.

In the embodiments illustrated in FIG. 13 and FIG. 14, by installing the function of the PU in the outside of the PU, e.g., the network interface described above, it also becomes possible to cause the SPU to execute processes in response to direct interruption from the network interface, without an intervening PU. Alternatively, the interface network or processing unit corresponding to the PU may be provided on network 104, and a certain SPU may actively access the network interface or the processing unit described above to obtain, without a intervening PU, communication setting information etc., for direct access to the target SPU. In this case, all or a part of the following functions are generated in the network interface or the processing unit by cooperation of a predetermined program and an architecture products that is generally similar to the PU (e.g., processor or the like).

(a) Resource allocator 603 and 5007, cluster manager 605, or similar functions. As to SPU status table 701, resource list 703, and cluster list 705, these may be installed in the network interface or the processing unit, or these may be managed by a server or a PU for allowing access from the network interface or the processing unit.

(b) A function for requesting resource allocator 603 or the similar function creator to perform optimal SPU cluster assignment for executing task through network communication, or a function for performing optimal SPU cluster assignment by itself.

(c) A function for requesting, upon receiving a task demand from a certain SPU, cluster manager 605 or a similar function creator to perform assignment of the task for a specified cluster, which is specified by referring a cluster list for a suitable cluster for the size or the kind of the task, through network communication, or a function for performing assignment of the task by itself.

(d) A function for managing (performing record/update by itself, or accessing to a server in which the network address is recorded) a network address of SPU or PU managing SPU.

(e) A function for preparing transfer of a packet, which includes communication configuration information of designated SPU to which the requested content of the first task and the executed result of the task is transferred, to a target SPU, or a function for actually transferring a packet to SPU.

According to the present invention, when a process management apparatus receives a task demand, the process management apparatus specifies the processing unit that can carry out the task required for the task demand is specified, and allows direct transfer of the executed result of the task between the specified processing unit and the origin of task demand. Therefore, overhead in the process management apparatus can be avoided. Thus, the distributed processing by a plurality of processing units can be performed effectively.

The invention claimed is:

1. A process management apparatus adapted to be connected to a network to which a plurality of processing devices are connected, each of the processing devices being capable of executing a requested task and transferring the executed result to a destination designated by the requester of the task, comprising:
    first management device operating to allow access to a predetermined memory in which the following are stored: (i) resource information representing task execution capability of the plurality of processing devices, (ii) communication setting information for enabling network communication with the plurality of processing devices, and (iii) a cluster list; and
    second management device operating to:
        generate the cluster list by grouping the processing devices into clusters based on: (i) sizes and kinds of tasks to be performed, and (ii) processing capability of each processing device obtained from the resource information representing the task execution capability of each processing device,
        receive a task demand from any of the processing devices through network communication, wherein the task demand includes requested content of a task, a process program for executing the task, and data for executing the task,
        specify a cluster containing at least one of the plurality of processing devices that is capable of executing the task by consulting the resource information and the cluster list stored in the memory and comparing the size and kind of the task with the processing capabilities of each processing device in the cluster list,
        set a data path designating a destination for a result of the task, and
        acquire the communication setting information for the at least one processing device within the selected cluster from the memory, and transfer, to the at least one processing device and the processing device that requested the task demand, the communication setting information for another processing device, thereby allowing direct transfer of the executed result between the processing devices through network communication.

2. The process management apparatus according to claim 1, further comprising:
    said memory; and
    holding device configured to record the resource information and communication setting information in said memory.

3. The process management apparatus according to claim 1, wherein the task includes:
    a task execution request for requesting execution of a subsequent task to be executed subsequently to the execution of the task; and
    information for a destination of the executed result of the subsequent task.

4. The process management apparatus according to claim 3, wherein the second management device operates to request, to the at least one processing device, execution of the subsequent task which includes the destination of the executed result of the received subsequent task.

5. The process management apparatus according to claim 3, wherein the second management device operates to cause the processing device that requested the task demand to request direct task execution toward the at least one processing device.

6. The process management apparatus according to claim 1, further comprising a shared space module for generating shared space on the network, wherein a plurality of said processing devices participate in or leave from the shared space at any time, the second management device operates to acquire communication setting information for the processing devices participating in the shared space generated by the shared space module and current resource information from the processing device, and lists the acquired communication setting information in the memory to put the acquired communication setting information into valid condition while putting the information listed for the processing device that left the shared space into invalid condition.

7. A computer system comprising:
    processing devices that are each capable of executing a requested task and transferring the executed result to a destination designated by a requester of the task; and
    a process management apparatus connected to the processing devices via an internal bus,
    wherein the processing devices and the process management apparatus are connected to a network via the internal bus, respectively, the process management apparatus comprising:
    first management device operating to allow access to a predetermined memory in which the following are stored: (i) resource information representing task execution capability of the plurality of processing devices, (ii) communication setting information for enabling network communication with the plurality of processing devices, and (iii) a cluster list; and
    second management device operating to:
    generate the cluster list by grouping the processing devices into clusters based on: (i) sizes and kinds of tasks to be performed, and (ii) processing capability of each processing device obtained from the resource information representing the task execution capability of each processing device,
    receive a task demand from any of the processing devices through network communication, wherein the task demand includes requested content of a task, a process program and data for executing the task,
    specify a cluster containing at least one of the plurality of processing devices that is capable of executing the task by consulting the resource information and the cluster list stored in the memory and comparing the size and kind of the task with the processing capabilities of each processing device in the cluster list,
    set a data path designating a destination for a result of the task, and
    acquire the communication setting information for the specified processing device within the selected cluster from the memory, and transfer, to the specified processing device and the processing device that requested the task demand, the communication setting information for other processing device, thereby allowing direct transfer of the executed result between the processing devices through network communication.

8. A device for distributed processing management adapted to be installed in a computer system adapted to be connected to a network to which a plurality of processing devices are connected, each of the processing devices being capable of executing a requested task and transferring the executed result to a destination designated by the requester of the task, wherein the device for distributed processing management executes a predetermined computer program to cause the computer system to operate as:

first management device operating to allow access to a predetermined memory in which the following are stored: (i) resource information for representing task execution capability of the processing device, (ii) communication setting information for enabling network communication with the plurality processing devices, and (iii) a cluster list; and second management device operating to:

generate the cluster list by grouping the processing devices into clusters based on: (i) sizes and kinds of tasks to be performed, and (ii) processing capability of each processing device obtained from the resource information representing the task execution capability of each processing device, receive a task demand from any of the processing devices through network communication, wherein the task demand includes requested content of a task, a process program for executing the task, and data for executing the task, specify a cluster containing at least one of the plurality of processing devices that is capable of executing the task by consulting the resource information and cluster list stored in the memory and comparing the size and kind of the task with the processing capabilities of each processing device in the cluster list, set a data path designating a destination for a result of the task, and acquire the communication setting information for the at least one processing device within the selected cluster from the memory, and transfer, to the specified processing device and the processing device that requested the task demand, the communication setting information for other processing device, thereby allowing direct transfer of the executed result between the processing devices through network communication.

9. A method for performing distributed processing in cooperation between a plurality of processing devices and a process management apparatus, each of the processing devices being capable of executing a requested task and transferring the executed result to a destination designated by the requester of the task, and the process management apparatus communicates with each of the processing devices via a network, the method comprising the steps of:

obtaining, in the process management apparatus, resource information for representing task execution capability of the processing devices connected to the network and communication setting information for enabling network communication with the processing devices, and listing the obtained information in a predetermined memory;

generating a cluster list of the plurality of processing devices based at least on the clustering generating a cluster list by grouping the processing devices into clusters based on: (i) sizes and kinds of tasks to be performed, and (ii) processing capability of each processing device obtained from the resource information representing the task execution capability of each processing device;

recording the cluster list in the memory;

analyzing, by the process management apparatus, types of requested tasks;

specifying from the cluster list a cluster containing at least one processing device for performing the requested task by consulting the resource information and the cluster list stored in the memory and comparing the size and kind of the task with the processing capabilities of each processing device in the cluster list;

transferring, to the processing devices, a task demand received at the process management apparatus based on the analysis, wherein the task demand includes requested content of a task, a process program for executing the task, and data for executing the task;

setting, by the process management apparatus in the process program included in the task demand, a data path designating destination for the executed result for the process program; and requesting, by the process management apparatus, the specified processing device to perform the task, wherein the request includes communication setting information of the destination of the executed result thereby allowing direct transfer of the executed result without intervention of the process management apparatus.

10. The distributed processing method according to claim 9, wherein the plurality of processing devices all have a processor element having a common structure.

11. The distributed processing method according to claim 10, wherein the processor element of the plurality of processing devices employs a common instruction set architecture (ISA), and can perform predetermined processing according to the same instruction set.

12. A computer readable memory having stored thereon a computer program for causing a computer to operate as a process management apparatus adapted to be connected to a network to which a plurality of processing devices are connected, each of the processing devices being capable of executing a requested task and transferring the executed result to a destination designated by the requester of the task, wherein the computer program causes the computer to function as:

first management device operating to allow access to a predetermined memory in which the following are stored: (i) resource information representing task execution capability of the plurality of processing devices, (ii) communication setting information for enabling network communication with the plurality of processing devices, and (iii) a cluster list; and second management device operating to:

generate the cluster list by grouping the processing devices into clusters based on: (i) sizes and kinds of tasks to be performed, and (ii) processing capability of each processing device obtained from the resource information representing the task execution capability of each processing device, receive a task demand from any of the processing devices through network communication, wherein the task demand includes requested content of a task, a process program and data for executing the task, specify a cluster containing at least one of the plurality of processing devices that is capable of executing the task by consulting the resource information and the cluster list stored in the memory and comparing the size and kind of the task with the processing capabilities of each processing device in the cluster list, set a data path designating a destination for a result of the task, and acquire the communication setting information for the specified processing device within the selected cluster from the memory, and transfer, to the specified processing device and the processing device that requested the task demand, the communication setting information for another processing device, thereby allowing direct transfer of the executed result between the processing devices through network communication.

13. The process management apparatus according to claim 1, wherein the network is a global network, wherein communication data exchanged between the processing devices is packed in packets, and wherein each packet includes a global unique ID that uniquely identifies the packet throughout the global network.

14. The computer system according to claim 7, wherein the network is a global network, wherein communication data exchanged between the processing devices is packed in packets, and wherein each packet includes a global unique ID that uniquely identifies the packet throughout the global network.

15. The device for distributed processing management according to claim 8, wherein the network is a global network, wherein communication data exchanged between the processing devices is packed in packets, and wherein each packet includes a global unique ID that uniquely identifies the packet throughout the global network.

16. The distributed processing method according to claim 9, wherein the network is a global network, and wherein the method further comprises exchanging communication data between the processing devices in packets, and including in each packet a global unique ID that uniquely identifies the packet throughout the global network.

17. The computer readable memory according to claim 12, wherein the network is a global network, wherein communication data exchanged between the processing devices is packed in packets, and wherein each packet includes a global unique ID that uniquely identifies the packet throughout the global network.

* * * * *